United States Patent Office 3,728,073
Patented Apr. 17, 1973

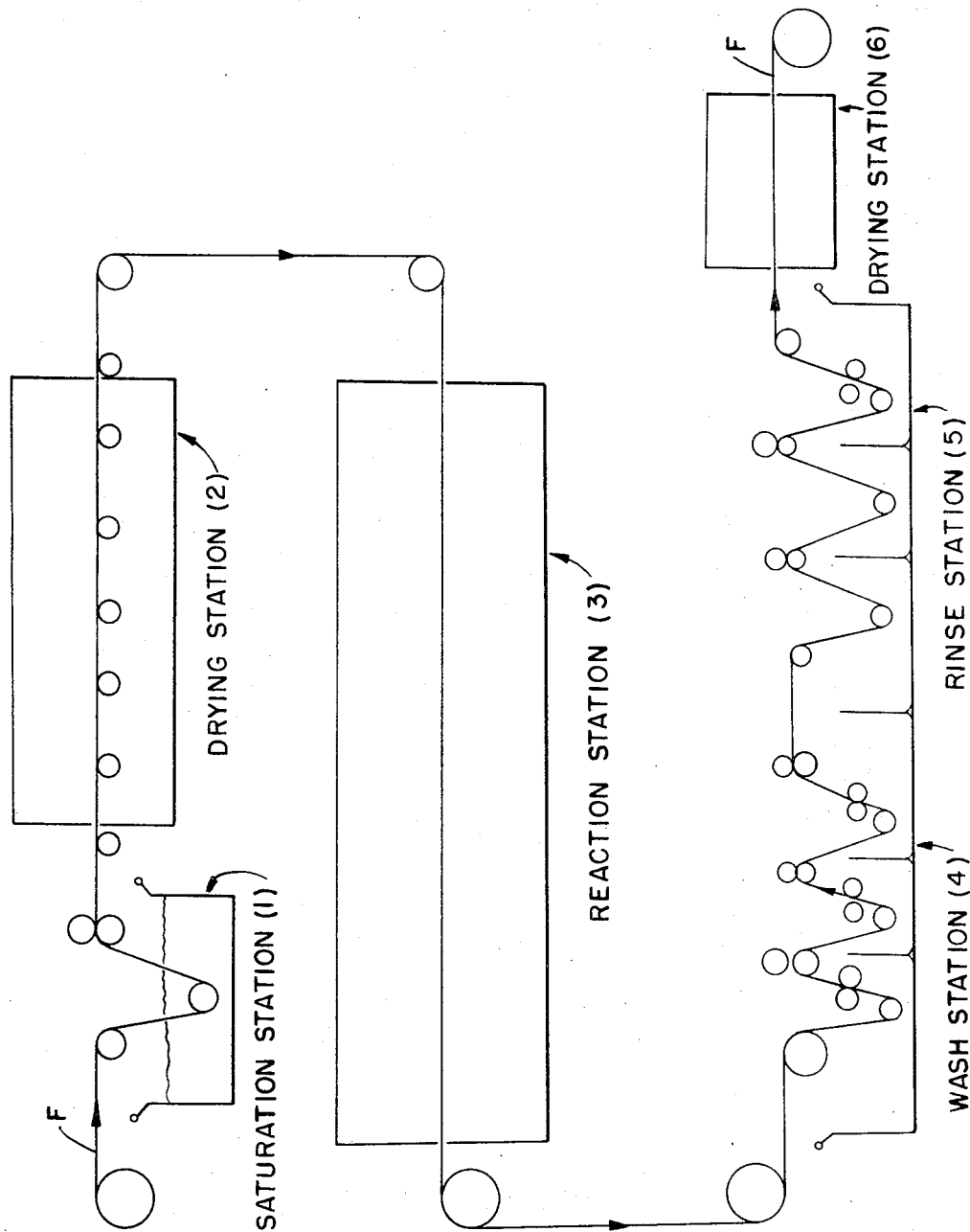

3,728,073
METHOD OF MAKING FLAME RESISTANT TEXTILES BY SUBSTITUTION OF C, H, O BY Mo OR W
Walter G. Pleskun, c/o David Clark Company Incorporated, 360 Franklin St., Worcester, Mass. 01604
Continuation-in-part of abandoned application Ser. No. 705,001, Feb. 13, 1968. This application May 20, 1971, Ser. No. 145,232
Int. Cl. D06c 7/04; D06m 1/22, 3/28
U.S. Cl. 8—115.5      40 Claims

ABSTRACT OF THE DISCLOSURE

An initial base material containing carbon and hydrogen atoms, preferably a textile in fiber form is heated with a reacting component containing a metal atom for the purpose of replacing part at least of the carbon and hydrogen atoms to increase the heat resistance and flame proof properties of the base material. The base material is preferably of the nylon type comprising a long chain polymeric amide, hereinafter frequently referred to simply as a polyamide, having recurring amide groups as an integral part of the main chain. Such base material is preferably heated with a reactive component or substance in a suitable vehicle or solvent. Such reactive component is preferably one containing a molybdenum atom though substances containing other metal atoms have been successfully employed. The base material is preferably thoroughly saturated with the reactive component, preferably molybdenum disulphide, in a suitable solvent or vehicle whereby a coating adheres to the base material. The saturated base material is then preferably dried and thereafter passed into a reaction chamber preferably in the presence of a catalyst and subjected to a high temperature which may range from about 600° F. to about 1200° F., preferably between about 700° F. and about 1100° F. and where a gaseous catalyst is employed preferably between about 700° F. and about 900° F. A temperature of about 800° F. has been found suitable for most purposes. The catalyst may be supplied in the saturating bath or when in gaseous form may form part of the atmosphere within the reaction chamber. Where a gaseous catalyst is employed it is preferably a halogen or halide such as fluorine, chlorine or hydrofluoride. After the reaction takes place the treated base material may be washed, rinsed and again dried. Suitable additives may be employed to improve the process such as anti-oxidants, surfactants and wetting agents of various types.

---

The present invention is a continuation-in-part of my application Ser. No. 705,001, filed Feb. 13, 1968 entitled High Temperature and Flame-Resistant Textile, now abandoned.

The invention relates primarily to a high temperature and flame-resistant product and to the method of making the same from a less heat resistant base material, preferably a fiber or the like for use in the textile industries.

More particularly the invention relates to the treatment of a base material having carbon and hydrogen atoms with a reacting component or metal atom, preferably one containing a molybdenum atom such as molybdenum disulphide in a solvent or vehicle.

Preferably the initial or base material is initially in fiber form and is of the nylon type though the process has been found to have utility when applied to other synthetic materials such as rayon and even to natural fibers such as cotton.

In accordance with the preferred embodiment of the invention the base material is subjected to a treating solution within a bath, containing a metal compound or atom such as molybdenum disulphide, preferably in the presence of a catalyst or the catalyst may be supplied at a later stage of the treatment. The catalyst may be gaseous such as fluorine, hydrogen fluoride (HF), chlorine or the like. Other catalysts such as hexafluoroethylene or the like, palladium, aluminum chloride, aluminum tribromide, magnesium titanite, cobalt trifluoride, vanadium oxytrichloride ($VOCl_3$), magnesium oxide and zinc oxide and mixtures thereof may be employed either with or without the gaseous halogen catalyst previously referred to. The above are mentioned by way of illustration only, as other catalysts may be used as will be apparent to those skilled in the art. As is well known the catalysts are used in relatively small quantities as compared with the treating metal-containing components or complexes.

Following saturation of the base material in the treating bath the treated base material carrying with it components from the bath is preferably dried, and then passed into a reaction chamber where it is subjected to high temperatures suitably within the range of from about 600–1200° F. with a range of about 700–1100° F. being preferable. A range of about 700–900° F. is particularly suitable, especially where a gaseous halogen catalyst is relied upon and for most purposes a temperature of about 800° F. has been found to be most satisfactory.

The gaseous catalyst may, if desired, be provided within the closed reaction chamber and the other catalysts may be supplied with the metal containing reacting component within the treating bath.

The reaction chamber is preferably closed and the atmospheric pressure may be widely varied within the scope of the invention in its broadest aspects but a range of from about ½ to 2 atmospheres has been found suitable in most cases. Similarly the time of heat treatment within the reaction chamber may vary considerably according to variations in the temperature and pressure and may be varied within a range of about ½ to 30 minutes depending on other conditions such as pressure, temperature, catalyst employed, the base material treated and the reacting component employed.

As previously set forth the invention is particularly concerned with the treatment of nylon or nylon-type base materials. Such materials are well known and comprise long chain polymeric amide groups —CONH— as a part of the main polymer chain as defined for example in Reinhold's "The Condensed Chemical Dictionary," 6th edition, pp. 819 and 820. A particular nylon known as HT–1 is referred to on page 580 and is intended for high temperature use. This type of nylon is derived from phenylenediamine and iso- or terephthalic acid. A similar material 's known as Nomex which is a trademark of E. I. du Pont de Nemours and Co., Inc. Both are suitable as base materials or initial starting products for the present invention. "Nomex" is the preferred nylon type base material employed and is the base material used in most of the specific examples and is sometimes referred to herein as HT-Nomex, HT indicating high temperature. Nomex is a trade name for a Du Pont nylon type fiber understood to be the copolymer of meta-phenylenediamine and isophthaloyl chloride and is referred to in Reinhold's The Condensed Chemical Dictionary, 7th edition on page 676. Nomex is a ready obtainable commercial product. The preferred mode of manufacturing HT–1 and Nomex types of nylon are described in Pat. 3,287,324 to Sweeny; see particularly Example 14 for HT–1 and Example 16 for the Nomex type of nylon in Pat. 3,287,324. Both types have been used effectively and HT–1 may be substituted for Nomex in the specific examples which follow in a later portion of this specification. Another high temperature nylon-type product recently developed by Celanese Polymer Co. is known as PBI and is likewise suitable as a base material for the present invention. Other suitable nylon-type materials are set forth for example in the following patents: Pats. Nos. 2,130,948; 2,244,192; 3,006,899; 3,094,511; 3,377,568; 3,354,125 and 3,354,127.

While nylon type fibers are preferred as the base or starting materials other fibers having carbon and hydrogen atoms such for example as rayon or cotton have been successfully treated with a suitable treating substance having metal atoms preferably with the aid of a suitable catalyst.

The treating substance or reacting component containing metal atoms is preferably supplied in a bath in solution form and the base material is saturated therein and thereafter heat reacted with the treating component to substitute at least some of the hydrogen and carbon atoms of the base material with the metal atoms from the treating component. While the metal atoms of the treating component are preferably molybdenum atoms others such as tungsten atoms have been found effective. Preferably the treating agent having metal atoms is a sulfide such as molybdenum disulfide or tungsten disulfide.

The above are given by way of example and not by way of limitation.

Following the reaction of the base material with the reacting component in the reaction chamber preferably with the aid of a catalyst the treated material is washed, rinsed and again dried.

If desired suitable additives such as anti-oxidants, surfactants, preferably anionic, and wetting agents may be used in connection with the improved process. Such additives are well known to those skilled in the art and their use is not an essential feature to the invention.

In a preferred embodiment this invention relates to the preparation of a synthetic polymer which can be best identified, at this point, as a metal substitute type polyamide. More specifically, this metal substitute type polyamide fiber or textile is prepared first from a base material comprising a synthetic nylon type polymer which may be formed by a reaction between phenylenediamines, isophthalic acid, terephthalic acid, or diaminobenzanilides diacid chlorides. Such wholly aromatic polyamides prepared from amino acid chloride, and hydrochloride form simple aromatic diamines and aromatic diacid chlorides or form various high molecular weight diamines and diacid chlorides. More specifically, the polymers prepared through the reaction are basic from diacid chlorides and diamines containing only two aromatic nuclei linked by a preformed carbonamide linkage.

Upon conclusion of this reaction, fibers or textiles are formed and such fiber or textile is treated or saturated with a metallic complex and in the presence of catalysts, is further reacted and yields a metal substitute type polyamide product thus substantially increasing heat and flame resistance.

BACKGROUND OF THE INVENTION

Synthetic fibers or filaments and articles made therefrom are not normally flame-resistant and melt at comparatively low temperatures and are therefore not useful and may even be dangerous in many applications, and this invention provides a process for rendering certain synthetics flame and high temperature resistant to greatly enlarge the applications and safety thereof.

It is known that synthetic fiber or textile made through the reaction of organic radicals derived from the phenylenediamines, iso-phthalic acid or terephthalic acid, diacid chlorides and diaminobenzanilides, are of higher heat resistance than conventional synthetic fibers or textiles; but in the presence of direct flame impingement or heat exceeding 600° F., this fiber or textile will melt or burn, therefore, becoming not useful and even dangerous in many applications. As a result, this invention provides a process for rendering certain synthetics flame and high temperature resistant to greatly enlarge the applications and safety thereof. In short, the fiber or textile processed by this invention, retains all the other characteristics of man made fiber or textile but does not burn or melt when subjected to direct flame at a temperature exceeding 1000° F.

This invention provides the upgrading of such said fibers which, by the reaction with the metal complexes, will virtually eliminate thermoplasticity or flow of such fiber and provide a non-burning characteristic even in the presence of direct flame impingement.

GENERAL DESCRIPTION OF PREFERRED EMBODIMENT OF INVENTION

The invention relates primarily to the processing of certain synthetic base materials such as aromatic polyamides in fiber, yarn or textile form, and particularly those which are composed of aromatic and heterocyclic rings, or more specifically, the resultant product of the reaction between phenylenediamines and isophthalic or terephthalic acid or diacid chlorides and diamines containing as low as two (2) aromatic nuclei linked by preformed carbonamide linkage or diaminobenzanilides and diacid chlorides of which their general formula is:

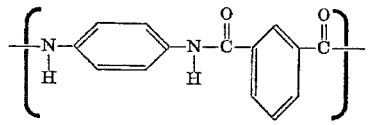

FIG. 1 wherein Ar represents a divalent aromatic radical which contains phenylene, naphthylene or biphenylene.

Such polymers or bases for this invention, are prepared by solution or interfacial polymerization methods employing the diamine in solution, and diacid chlorides either in dry form or in solution, in a suitable organic solvent. The diamine used for this invention may be used not only in the form of diamine but also in the form of diamine dihydrochloride which include all of the various benzanilide isomers which are non-ortho oriented. These diamines include 3,3'-diaminobenzanilide, 4,4'-diaminobenzanilide, 3,4'-diaminobenzanilide and 4,3'-diaminobenzanilide.

The above listed diamines may be prepared by any of the well known methods.

Such base materials used for this invention may also be ortho, meta and para phenylenediamine structures $C_6H_4(NH_2)_2$, otherwise known as diaminobenzene which is characterized with terephthalic or paraphthalic acid, i.e. paradicarboxylic acid $C_6H_4(COOH)_2$.

The product of the reactant materials described above, specifically in fabric or fiber form, has wide commercial possibilities since they have excellent physical strength and other properties which are valuable and can be advantageously utilized as reinforcement for tires, conveyor belts, diaphragms, protective garments and the like. However, their utilization has been greatly retarded because of the limitation in over 600° F. range, particularly in hot environment where percentage of oxygen is high or, direct flame impingement.

This invention provides a process by which the above materials become excellent in high heat performance, to a degree, wherein sublimation or degradation would only occur during red heat particularly at or over 1800° F., depending on the concentration of oxygen and the ambient pressure. Also, flammability and excessive flame propagation during the above indicated temperature range are avoided.

The toxicity of the fume generated during the sublimation or burning at the above indicated temperature, is generally eliminated. These advantages are obtained by chemically changing the base material, by means of chemical reduction and substitution of organic portion, namely hydrogen (H) and other undesirable elements available in said base material, which tends to alter the point of flammability.

As previously set forth commercially available nylon type products sold under the trade names HT–1 and Nomex have been found as particularly suitable as base materials. In the process a portion of the base material is chemically changed by chemical reduction and substiution of part of the organic portion, namely hydrogen and carbon and other undesirable elements which are substituted in part at least by metal atoms whereby the heat and flame-resistant properties of the initial base material are greatly improved.

Briefly stated the base material, preferably an organic fiber having replaceable carbon and hydrogen atoms, is treated with a treating agent having metal atoms.

Such substitution is accomplished by means of pre-treatment (saturation) of the organic base material with a treating agent which is a chemical compound consisting of complex elements of inorganic and mineral categories. These are formulated, assuming liquid form with various carriers and particle size, partially suspended, ranging between ½ and ¾ micron. The compound consists of negative, single valence ions and four valence positive ions of which the majority are four valence and act as substitutes for carbon which is also of equal valence and positive ions.

Illustrative examples of compounds which may be used are as follows:

(1) Molybdenum disulfide ($MoS_2$) also known as molybdenite (a) Melting point _____ ° C__ 1185
(b) Specific gravity _____ 4.8

(2) Molybdenum pentachloride ($MoCl_5$)

(a) Melting point _____ ° C__ 194
(b) Specific gravity _____ 2.9

(3) Molybdenum sesquioxide (dimolybdenum trioxide, molybdenum II oxide) ($Mo_2O_3$), which approximates the composition of the sesquioxide that is a mixture of molybdenum and molybdenum dioxide.

(4) Molybdic acid (molybdenum trioxide)

(5) Molybdenum isotopes, 98, 96, 95, 100, 97, 94

(6) Tungsten disulfide

After as complete saturation as is possible, so that molybdenum compound particles cling to the fiber, the base material is then dried either at room temperature or by accelerated means and thereafter it is placed in a controlled chamber having a predetermined environment which contains gaseous catalysts such as fluorine or chlorine, and the temperature and length of time is also controlled in order to obtain an acceptable result as is indicated hereinafter.

Examples of suitable catalysts are as follows:

(1) Hexafluoroethylene ($C_2F_6$) and members of the homologous polymer series which includes trifluoro, trichloroethylene $(CF_2—CFCl)_x$ chlorotrifluoroethylene $$Cl(CF_2—CFCl)_xCl$$

cobalt trifluoride ($CoF_3$), etc.

(2) Palladium
(3) Magnesium titanate
(4) Vanadium oxytrichloride ($VCl_3O$)
(5) Magnesium oxide (MgO)
(6) Zinc oxide (ZnO)

The molybdenum compounds when heated in the presence of fluorine, chlorine and N nitrogen, combine directly to substitute molybdenum molecules for the corresponding hydrogen or halogen elements or molecules specifically hydroxyl or carboxyl, i.e., OH or CO, and then CH, where H is reacted or sublimed with the aid of heat and a catalyst, thus forming a new molecular structure in the main fiber.

The base material becomes black to reddish to brownish in color and sublimes only during the red hot heat at a temperature of 2200° F. or at a minimum temperature of 1800° F. in the presence of 16 p.s.i.a. 100% oxygen. The sublimation is in the form of white smoke of which the toxicity is equivalent to iron.

The process per se constitutes:

(1) Treatment of the base fiber, or finished base product, by saturation in achemical compound consisting primarily of molybdenum or other metal such as tungsten and the like but which may also contain a very small amount of fluorine or chlorine, which seem to aid in the subsequent steps of the process. The saturated base material is then air dried at room temperature or by accelerated means.

(2) The thus treated base fabric (or fiber) is then exposed to a predetermined environment in terms of pressure and temperature which are controlled within a chamber where catalysts such as fluorine or chlorine are present.

(3) The air inlet for the chamber, i.e., reactor, is equipped with manual or automatic controls to facilitate monitoring gas flow. The exhaust port of the chamber is also monitored to allow either a negative or positive pressure to be maintained within the chamber e.g. (.01 inch of water). This can be accomplished by vacuum pumps or exhaust outlet and gas entering into the chamber.

(4) The reaction time is relevant to the size of the reactor and its temperature, but an effective condition is 30–45 min., treatment at about 800° F.

(5) The materials are then passed through a washing reservoir which removes the by-product residues deposited on the surface. The first wash consists mainly of warm water and 3–5% of concentrated soap or detergent.

(6) After the initial washing, the material is passed through three (3) stages of rinses, thus assuring soap or residue removal.

(7) Following these stages, the material is dried at 140° F. or up to 300° F. depending on speed or air velocity.

(8) After removal of residue and drying, the material is ready for use.

MORE DETAILED DESCRIPTION OF PREFERRED EMBODIMENT OF INVENTION

Initially, thermally stable polyamides were synthesized from pyromellitic dianhydrides in two isomeric diaminoanthraquinones. The syntheses were accomplished through ester-blocked prepolymers with methanol as the blocking reagent. The reaction of PMDA (pyromellitic dianhydride) with methanol, gave a diester-diacid which was converted to the corresponding diester-diacid-chloride with thionyl chloride. The reaction of equivalent amounts of the diester-diacid chloride and diaminoanthraquinone in N,N-diethylacetamide solution, gave the soluble ester-blocked polyamide prepolymer. The prepolymer was converted to the corresponding polyamide by thermal cyclization at 300° C. Several properties of the ester-blocked prepolymer and polyamide were studied. The blocked prepolymer poly[2,6 - anthraquinonylene - 2,5 - bis(carbomethoxy) terephthalamide] (2,6-DAQ BPP) from pyromellitic dianhydrides (PMDA) and 2,6-anthraquinonylene, which appeared more resistant to thermal imidization than the corresponding unblocked prepolymer (polyamic acid) when heated for two hours at 200° C. The blocked prepolymer from pyromellitic dianhydride (PMDA) showed reduced imidazation. The average molecular weight of poly[2,6 - anthraquinonylene-2,5-bis(carbomethoxy) terephthalamide] was increased from 8,500 to 16,800 by the thickness of solid state polymerization. The prepolymer poly[2,6 - anthraquinonylene-2,5-bis(carbomethoxy) terephthalamide] was still completely soluble after solid state polymerization and exhibited excellent volumetric stability. The solution in N,N dimethylacetamide showed no viscosity decrease for 510 hours at 25° C. The two polyamides showed excellent stability as measured by thermograph analysis. The polyamide poly[1,5-anthraquinonylenepyromellitimide] [1,5–DAQ BPP] from PMDA and 1,5-diaminoanthraquinone, was fairly stable up to 400° C. in both air and nitrogen. The isomeric poly[2,6-anthraquinone polymer] and poly[2,6-DAQ BPP] from PMDA and 2,6-diaminoanthraquinone, showed improved stability up to 400° C. for a short period of time.

Under the same condition a powdered sample of 2,6-diaminoanthraquinone retained 88% of its original weight on isothermal aging in the air at 316° C. (600° F.) for 500 hours. The weight retained was 75% when aging was carried out at 343° C. (650° F.), for a short period of time. In the process of the preparation of these prepolymers, it was realized that there was a limitation of thermal properties of these products and that they were already in existence particularly in the fiber and textile forms. Therefore, an attempt was made to synthesize and draft a complex of elements which would alter the basic polyamide structure and thus increase its thermal and chemical properties.

In view of the recognized need for such a product, emphasis was concentrated to analyze existing structure of an aromatic or general polyamide and its behavior at a high temperature.

Examination of the isomer structure

The synthesis of isomeric polyamide is shown systematically below.

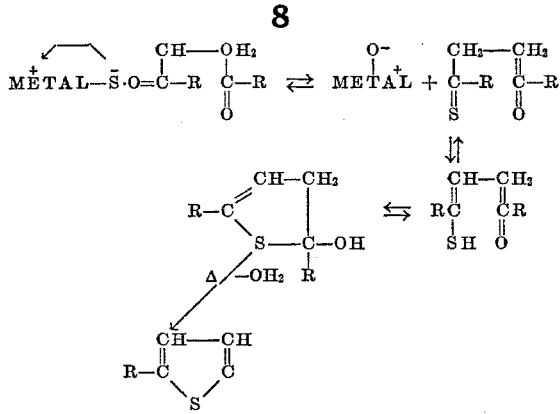

FIG. 3

The above reaction sequence is, however, a concerted mechanism which, at elevated temperatures (over 600° F.), has been observed to occur in appreciable yields, approximately 0 to 0.07 second of contact time. The reaction has been used for commercial production using either sulfur vapors or sulfur composition although there are no references thus far, pertaining to $MoS_2$ used for this purpose. However, in the actual experiments, the $MoS_2$ did react as $MoS_2$ or probably partial as sulfur vapors present from $MoS_2$ decomposition.

In the case at hand, the reaction sites are denoted with heavy dark lines as shown in FIG. 4:

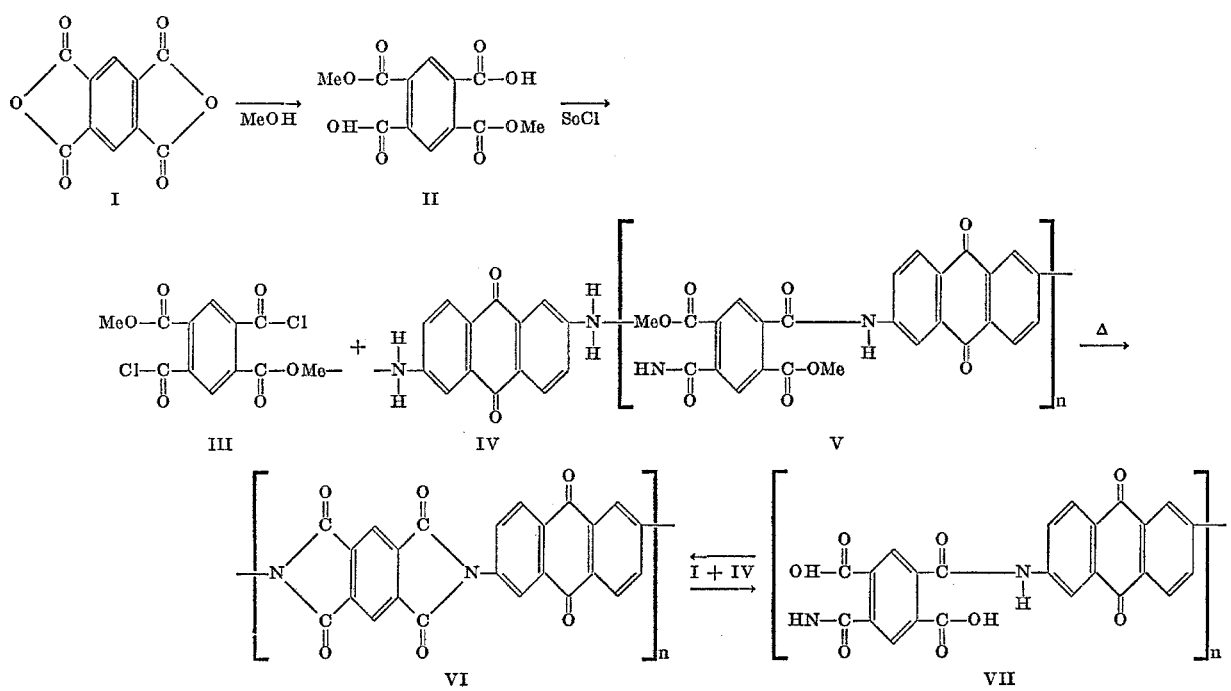

FIG. 2

Examination of the above compounds (reactions I–VII) further reacted with metal complex of $MoS_2$, in particular, suggests the following resultant isomeric changes.

REACTION 1.—FORMATION OF THIOPHENE STRUCTURES

The thiophene structures are heterocyclic compounds formed by the replacement of oxygen atoms by sulfur, enolization, cyclization by addition, and elimination of water.

In general, they follow a mechanism as follows:

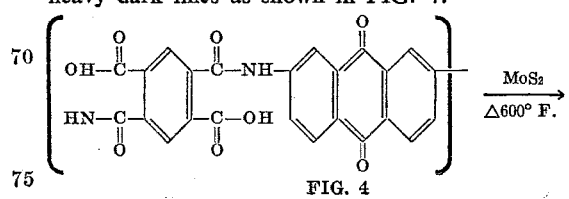

FIG. 4

9

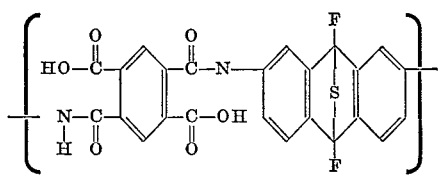

FIG. 5

In FIG. 5, the sulfur may or may not be bonded to the molybdenum atom, however, this is discussed later.

An interesting observation is the formation of a sulfonorbornadiene ring (shown in dark black lines in FIG. 5). Norbornadiene (FIG. 5A), a three dimensional structure of the sulfur-substituting system, is situated and thus free to form metal chelates because of the electron pairs protruding from the raised sulfur atom.

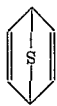 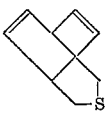

FIG. 5A    FIG. 5B

REACTION 2.—REACTION OF GAMMA AMINO ACIDS WITH HEAT

The reaction yields cyclic amides which are known as lactams

The general reaction of amino acids are as follows:

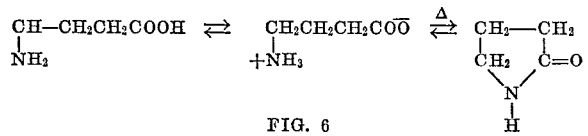

FIG. 6

The production of the alpha ($\alpha$) butyrolactam known as pyrrolidone, is shown below, with the reaction denoted in heavy dark lines.

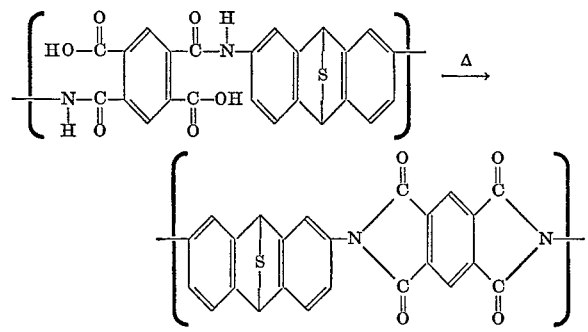

FIG. 7

However, it can be noted now that there are two more 1,4 diketone structures which can undergo the formation of additional thiophene structures. The reaction, with the reaction sites indicated in heavy black lines, is shown below:

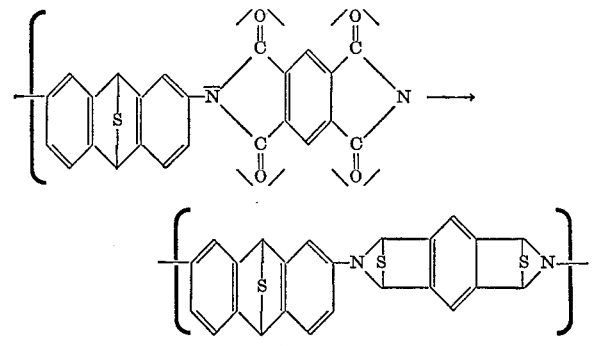

FIG. 8

10

The above structure probably has several electron resonance forms which would be stabilized by the reaction of the $F_2$ gas or hydrogen fluoride (HF) to reduce the conjugation.

The above-mentioned forms would be:

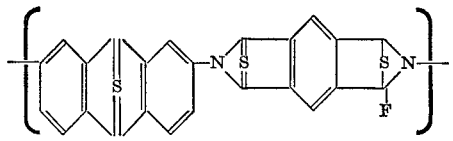

FIG. 9

The sulfur can form C=S=C bonds under high heat but would be stabilized quicker by $F_2$ gas or HF. However, this depends on the amount of $F_2$ present. Most of $F_2$ would be used in the reaction and S=C bonds would stabilize out the remaining reaction.

This double bond stabilization process has one important point; there is no hydrogen, oxygen or loose branches existing due to high heat reaction and sublimation. There is merely a chain of carbon atoms protected by sulfur atoms which are mostly attached to the molybdenum atoms.

The next consideration is that of the role that the molybdenum atom plays in the system structure of the compound. Based on the X-ray analysis, it is evident that the molybdenum or electron structures possessing a $5s^1$ and $4-d^5$ electrons thus can undergo $sd^5$ hybridization which would follow an octahedral formation as shown below:

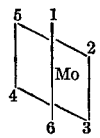

Note: Each of the 6 positions shown above can form chemical bonds and two sulfur atoms, the four of these positions having two for reaction.

The primary reaction is the sharing of the free electron pair of the amine nitrogen to the molybdenum atom. Thus, the $MoS_2$ would act as chain extension and lattice formation agent.

Upon exploration of the actual lattice structure, the stereochemistry of the resultant molecule previously described, the sulfur in the thiophene structure is very similar to the norbonadiene. Therefore, the sulfur is in a plane above the reaction.

This sulfur is connected to another molybdenum atom and then connected to another sulfur, thus forming a four layer system essentially chelate. There is another carbon layer above the sulfur but this is the start or beginning of the next set of layers.

Recognizing that the carbon is only one layer shielded by three layers of inorganic material on each side, greatly enhances the resistance to high heat and flammability of the final product; especially since there is nothing but carbon, nitrogen, sulfur, molybdenum and traces of halogen, such as fluorine, in the total structure.

There is one more reaction of the $MoS_2$ hybridization; that of the amine electron sharing.

The amino group is part of a four member ring which contains the sulfur atom.

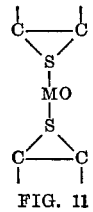

FIG. 11

The nitrogen is the tertiary amine group which will form internal quaternary ammonium salts. The sterochemistry of the nitroen having the large electron group on the top forcing the 3 N=C bonds down to form a tetrahedral formation with the sulfur atom below the nitrogen atom at about a 47° angle, which look similar to the FIG. 13 with the line over the N representing the electron pair;

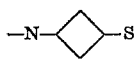 

FIG. 12    FIG. 13

Thus, Sd⁵ hybridization would form the quaternary ammonium internal salt structure at about a 135° angle from the sulfur atom, and the bond would be as shown in FIG. 14:

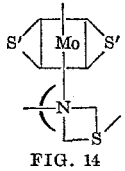

FIG. 14

Where the two S¹ atoms may be further joined to the thiophene structure thus the carbon atom structure, also molybdenum groups, would be off to the sides at a 45° angle depending on the amount of MoS₂ which is found in a configuration as a sphere with the carbon structure at the center of the sphere having three layers of coatings of molybdenum and sulfur shells.

As a result, the final molecule resembles structure shown in FIG. 15 and indicated with a heavy dark line) the shell of inorganic of MoS₂ in four different planes.

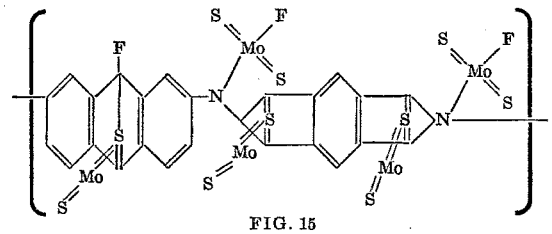

FIG. 15

The research and experiments as well as theoretically derived synthesis indicate the reduction and substitution of basic polyamide in the presence of various catalysts and specific environment. As a result, various metallic or metal-containing compounds or monomers were experimented or used as part of this invention which would allow thermal improvement of the existing fiber.

Among such experiments the following basic compounds were evaluated; as treating agents containing metal atoms:
(A) Tungsten disulfide—was ground to a micron particle less than .25 microns and dispersed in colloidal suspension containing 20% of pure tungsten disulfide.
(B) Molybdenum trichloride dibenzoate,

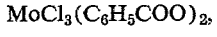

molecular weight 444.5—this compound, light green in color, was dissolved in 25% triethyl acetate and 70% tetrahydrofuran along with 5% of 12-dimethoxyethane. The concentration used in this experiment ranged from 8 to 12% containing pure molybdenum trichloride dibenzoate.
(C) Molybdenum trichloride, $MoCl_3$—molecular weight 202.32—this product is commercially available in dark red powder. The product in the presence of heat, was dissolved in pyridene ranging in concentrations between 2 and 5%. Hence, this product is sensitive to air and moisture. 2,2'-dipyridyl, n-propyl cyanide and o-phenanthroline, were added in concentrations of 2 to 3 parts per 100 to form complexes which subsequently yielded molybdenum oxychlorides.
(D) Sodium 12-molybdosilicate, $Na_4[SiMo_{12}O_{40}] \cdot xH_2O$ [$x$=10–15] molecular weight 2163.5 for [14 hydrate] —bright yellow, 30% of the product was dissolved in distilled, dimineralized water which gave a yellow solution.
(E) Ammonium 9 - molybdonickelate (IV) ($NH_4$) [$NiMo_9O_{32}$]. 6.5 $H_2O$—molecular weight 1659.3 very dark red, almost black in appearance. This was dissolved in 5 grams/100 mm. of water at 70° C. The heteropolyanion is isostructural with the corresponding 9-molybdomanganate (IV) anion. The nickel is tetravalent and octahedrally coordinated. The 9-molybdonickelate (IV) anion, was found to be monomeric in solution. The pH was adjusted to 5.5 to compose the heterpolyanion.
(F) Molybdenum disulfide ($MoS_2$) molybdenite—is a dark, almost bluish substance which was first ground to less than 1/10 of a micron and then emulsified or refined in 50% ethyl alcohol and 50% isopropyl alcohol dispersion at concentrations of 10 to 20% containing pure molybdenum disulfide.
(G) Molybdenum pentachloride ($MoCl_5$)—is highly hydroscopic dark red when dissolved in dry anhydrous alcohol. The concentration used was 5 to 10% in solution.
(H) Molybdenum sesquioxide (dimolybdenum trioxide, molybdenum III oxide) $Mo_2O_3$—which approximates the composition of the sesquioxide in a mixture of molybdenum and molybdenum dioxide. 3 to 5% of pure compound dissolved in anhydrous alcohol was used.
(I) Molybdic acid anhydride ($MoO_3$ trioxide)—$MoO_3$, white at ordinary temperatures, yellow at elevated temperatures. One tenth to ½% of the compound was dissolved in equivalent weight of sulfuric acid and adjusted to 4 pH with distilled and dimineralized water.
(J) Molybdenum isotopes, 98, 96, 95, 100, 97, 94

The above selected, metal-containing compounds were then formulated further by the addition of catalyst and appropriate wetting agents, following saturation of the fiber or fabric made initially from the aromatic polyamide. The solutions were adjusted to viscosities ranging between 10 and 60 cps. Brookfield, #2 spindle and 30 r.p.m. at a temperature of 68° F. Various densities and weights of fibers and textiles consisting of various weaves and patterns, were treated or saturated with the prepared solution containing metallic chelates, complexes or radicals and subsequently reacted.

The preferred steps of the process will be more readily understood by reference to the accompanying drawing, which will be sometimes referred to hereinafter as Process Diagram I. In the drawing F denotes the fiber being treated, preferably of the nylon type such as Nomex or HT–1. The apparatus is shown diagrammatically and includes a saturation station (1), a drying station (2), a reaction station (3), a wash station (4), a rinse station (5) and a second drying station (6), to which stations the fiber F is successively passed in the preferred embodiment of the invention.

Referring more specifically to the individual steps of the process the fiber or fabric is first passed through a bath as shown in station 1 where the set fiber or fabric is totally saturated, encapsulated, dried and weighed. The coating (padding) deposited on or added to base fiber or textile as dry weight is equivalent to 5 and up to 45% of the dry weight of given base fiber or textile. The vehicle or solvent is evaporated or extracted, as shown in station 2, by means of heat ranging from 160° F. to 450° F. and exhaust velocity of 30 to 40 cu. ft./min. In some instances negative pressure or 18 inches vacuum of mercury was also used during the experimental program as a substitute for high heat solvent extraction. Subsequently, the material or fiber coated with pre-designated weight of the metal complex containing metal disulfide, predominately molybdenum, disulfide and catalyst, is entering the reaction chamber as shown in station 3.

The reaction chamber at this point is raised to a temperature between about 600° and about 1200° F. and preferably about 800° F. and the atmospheric pressure reduced to a minimum of 15 inches of mercury or as per requisite, for the first stage of the reaction. Subsequently, or in concert, the ambient pressure or environment is maintained at a high temperature and standard or nitrogen enriched atmosphere. A completely inert atmosphere was also provided by means of monitoring and maintaining constant flow from 4 to 8 standard cu. ft./min. of helium, nitrogen and argon gases, however, nitrogen is preferred.

In the presence of the catalysts, which are at this point present within the coating applied to the polyamide fiber or fabric, initiate the reaction where, in concert the transition between the extraction or sublimation of hydrogen and some oxygen, is being substituted with sulfur and molybdenum thus creating layers of chelates.

The primary reaction is the sharing of free electron pairs of the amine nitrogen to the molybdenum atom; thus molybdenum disulfide functions as a chain extension and lattice formation component.

The exact reaction explanation, although not fully characterized, is based on the analysis and experiments offered under the heading of Molecular Structure Analysis.

The catalysts used for this purpose are preferably predominately halogen, such as fluorides or chlorides or metallic oxides which aid in initiating and stabilizing several electron resonance forms, promoting reaction and reducing conjugation.

In addition to gaseous halogens or halides the most suitable catalysts used were:

(1) Hexafluoroethylene ($C_2F_6$) which are homologous polymer series such as trifluorotrichloroethylene $Cl(CF_2-CFCl)_xCl$, chlorotrifluoroethylene $(CF_2-CFCl)_x$, cobalt trifluoride ($CoF_3$) etc.
(2) Palladium
(3) Aluminum trichloride ($AlCl_3$)
(4) Aluminum tribromide
(5) Magnesium titanite
(6) Vanadium oxytrichloride $V_2O_2Cl_3$
(7) Magnesium oxide (MgO)
(8) Zinx oxide (ZnO)

The above mentioned catalysts were used in quantities ranging from about 2 parts per million (p.p.m.) to 3% based on the weight of the non-volatile metallic complex compound, such as $MoS_2$. The total dwell time of the fiber or textile reacting in the reaction chamber, as shown in station 3 of the drawing is between .7 to 70 minutes depending on the surface area of the reactant and total weight of both the coating and the textile or fiber, at this point, consisting primarily of the aromatic polyamide. Upon conclusion of the reaction, the fiber or textile leaving the reaction chamber, changes color from brown to gray or black depending on the percentage of reaction constituted, or programmed and yielded.

Upon cooling the fiber or textile passes through a washing stage as shown in station 4 of the drawing where the excess of byproduct or residue of ash, which was created by the sublimation of the undesired product, is removed by washing whereby the main product is dried at accelerated air oven, station 6, thus yielding a flame and heat resistant useful product. The washing stage consists in treating with a highly emulsifying detergent-type substances which readily removes the residue and thereafter the material is passed through a bath where it is rinsed, station 5, several times with clean water and neutralized in the event any traces of acid or alkaline are present before passing to station 6.

Where a nylon fiber such as HT-1 or Nomex is used as the base material and the treating material is a solution of molybdenum disulfide or tungsten disulfide the final product is flexible, brown to black in color, has an initial weight loss between 5 to 10% that of original weight and assumes new character in terms of specific physical properties. During the transaction of the simultaneous change from aromatic polyamide to metal substitute type thiopolyamide, the fiber or textile is highly elastic, slippery and retains high strength, heat resistance and virtually is not affected upon impingement of flame.

Based on analysis, the original nylon type polyamide fiber loses some carbon, hydrogen and oxygen and gains sulfur, molybdenum, and fluoride or chloride or both. The data to date, indicates that where molybdenum disulfide is used as the treating component at least up to 15% of sulfur and 7% of molybdenum disulfide are reacting with one equivalent of basic material. The reaction forms a molybdenum bridge or layers containing 3 to 5% sulfur atoms which aid in elasticity. One percent of sulfur or hydrogen sulfide discharges as the remaining disulfide groups react with the hydrogen and carbon fragments.

In accordance with the actual experimental procedure and employing a polyamide fiber as a base material in manufacturing high temperature, flame resistant textile or fiber containing metal, particularly molybdenum substituted type thiopolyamide, the following was accomplished under laboratory procedures:

(1) Polyamide fiber and finished fabrics initially treated by saturation in a bath containing a solution of prepared treating compounds. The prepared compounds contain suitable intermediates and catalysts, herein set forth, as shown in the examples, where in each case the compound being used for saturation contained $MoS_2$ compound and fluorine or chlorine molecules as components of the catalysts, and metal oxide as an acid acceptor.

The treated fabric after obtaining the predesignated weight, is air dried either at room temperature or in the oven (station 1).

(2) The treated fabric or fiber is then placed in the reaction chamber (station 3) while the temperature is either room temperature or above. The chamber is then filled with inert gases or atmosphere and heated. The air inside the chamber and the exhaust are controlled by dictates of the gas flow; internal pressure build up due to sublimation of materials and speed or time of reaction. The cycle is predetermined based on the weight of the original material being subjected to the reaction and the total heat and flame resistance of the final product required.

(3) The chamber temperature in the reaction chamber (3) is raised from room temperature to about 600° F. minimum and about 1200° F. maximum; however 800° F. is preferred. The reaction time is relevant to the size of the reactor, its temperature and the reaction programmed; however 30 to 45 minutes of heating and cooling cycle is preferred.

Using a reactor measuring 9 cubic feet, the cycle during the reaction was as follows:

TABLE I.—REACTION CYCLE

| Time in minutes | Temp., ° F. | Nitrogen flow, c.f.m. | Water pressure, inches negative |
|---|---|---|---|
| 0-6 | 75-300 | 0 | .01 |
| 6 | 300 | 1 | .02 |
| 8 | 350 | 2 | .06 |
| 10 | 400 | 3 | .08 |
| 25 | 650 | 3 | .07 |
| 26 | 675 | 2 | .06 |
| 35 | 790-800 | 2 | .06 |
| 65 | 790-800 | 2 | .05 |
| 80 | 790-800 | 2 | .05 |
| 85 | 750 | 2 | .05 |
| 100 | 690 | 2 | .03 |
| 165 | 550 | 2 | .03 |

(4) The base material F is passed through a washing reservoir (4) which removes all existing residue.

(5) After the initial washing, the material is passed through the three steps of rinsing at station 5 thus assuring soap or residue removal. Following this the material is dried at station 6 at a temperature ranging from about 140 to about 300° F. depending on exhaust or air velocity.

(6) After drying the material is considered ready for use.

EXAMPLES

Typical Example A

The nylon type base material F, namely Nomex is saturated in a solution e.g. molybdenum disulfide containing finely divided molybdenum particles of a size approximating one-half micron, for several minutes. The Nomex is then dried and thereafter placed in a nitrogen atmosphere containing a very small (catalytic) amount of chlorine and heated to 800° F. for about forty minutes. Thereafter the altered material is washed, rinsed and dried and is ready for use in any way that may be found advantageous.

The steps of the process are more fully represented in the accompanying drawing which has already been described.

While Nomex is referred to as the preferred nylon type base material other nylon tpye base materials may be employed such as HT-1 and in some cases other fibers or fabrics such as cotton or rayon may be employed.

In the presence of catalysts, the molybdenum disulfide ($MoS_2$) molecules react with the base material forming radicals, replacing hydrogen, carbon and oxygen atoms. During such a reaction, hydrogen sulfide and carbon dioxide or monoxide are liberated or evolved in the form of free gas which are replaced with molybdenum sulfide, molybdenum ions and halogen groups, molecules or atoms.

During the substitution or replacement of atoms, a change of basic molecular structure takes place, resulting in changing weight, color, and elasticity of the basic fiber. This dramatic change occurs when at least up to 5% of sulfur and 2% equivalent of molybdenum disulfide are reacting with equivalent of one-half of the basic material. The reaction forms a molybdenum bridge in the structure containing 3 to 5% sulfur atoms which aid in elasticity. Approximately 1 mole of hydrogen sulfide discharges as the remaining molybdenum disulfide groups react with the hydrogen and carbon fragments and nitrogen groups. As the remaining molybdenum groups react with carbon and hydrogen fragments, a polymeric network builds, bridging the organic structure with atoms of molybdenum.

FURTHER SPECIFIC EXAMPLES

Specific examples showing in detail the preparation of specific treating baths will now be described and various fibers, particularly nylon type fibers such as HT-1 and Nomex are treated by saturating in such baths. In some cases fibers or fabrics other than nylon type fibers or fabrics may be treated as will be apparent.

In preparing the treating materials for the treating bath, the metal complexes of this invention already described, may be employed and applied directly to fabric or textile F, made initially from aromatic polyamide such as HT-1 or Nomex. Preferably, however, the following examples illustrate the invention wherein metal complexes are included as part of formulation used in actual saturation of fibers and manufacturing of a high temperature and flame resistant product.

Example 1.—Preparation of treating bath 30 parts of $MoS_2$
30 parts of isopropyl alcohol
10 parts of trichlorofluoroethane ($CCl_2CClF$)
.002 part of nitric acid—(.2 normal)
.2 part of antioxidant
1 part of zinc oxide
2.798 parts of anionic surfactant
24 parts of isobutyl alcohol
2 parts of water The solution was allowed to react in a high pressure vessel and emulsified to stable suspension of the reactive product. It was then coated on nylon type polyamide fiber or other desired fiber or fabric F, at station 1 thus assuring full saturation. Upon removal of the volatile and undesirable vehicles at station 2, the coated fabric F was then placed in a chamber (station 3) having suitable ambient temperature and pressure controls. The fabric F was then allowed to react in the chamber from 1 to 10 minutes at a temperature of from about 600 to about 900° F., monitoring the internal pressure from half to three atmospheres.

During the reaction, inert and oxidizing gases were injected in the sequence of the reaction. Upon conclusion of the reaction, the coated fabric F was passed through a three cycle pool where the non-reacted residue or subliming deposits were removed, the fabric neutralized and, in the final stages, cleaned and dried. (Ref. Tables IX and X.)

Example 2

20 parts of $MoS_2$
5 parts of dispersion agent (surfactant)
2 parts of wetting agent
73 parts of tetrahydrofuran Alcohol (THFA)

The composition of Example 2 was ground on ball mill for 24 hours until particle size reached less than half a micron, subsequently; 2% dimethyldichlorsilane $$(CH_3)_2SiCl_2,$$

molecular weight, 129.07, was added.

3% of magnesium titanite
5% of molybdenum acetylacetonate $Mo(C_5H_9O_2)_n$

The above treating compound was allowed to stand for 24 hours under continuous grinding and agitation. Upon completion the 5.5 oz./sq. yd. of aromatic polyamide fiber F was totally saturated, dried and processed as described before.

Example 3

20% solution of $MoS_2$
5% of molybdenum disilicide ($MoSi_2$), less than half a micron particle
10% based on the $MoS_2$ of chlorotrifluoroethylene ($CF_2$–$CFCl$), molecular weight ranging from 10,000 to 20,000

The above substance of Example 3 is then diluted to 10% solids in the following solvents:

|  | Percent |
| --- | --- |
| Trichloroethylene | 60 |
| Dimethyl formamide (DMF) | 40 |

Example 4

85 grams of $MoS_2$, 24% non-volatile solution
8 grams of perfluoroethylene ether 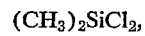 ($C_8F_{16}O_2)_n$
2 grams of magnesium oxide
.3 part of sulfuric acid, .3 normal
.5 part of antioxidant
4.2 parts of tetrahydrofuran The above compound is mixed for three hours. Upon conclusion it is applied directly to the fiber or fabric F until total saturation occurs. Following this, the system is dried and processed in the reactor chamber as stated previously. (Ref. Table II.)

TABLE II.—FABRIC REACTED WITH COMPOUND EXAMPLES

| Properties | 1 | 2 | 3 | 4 |
|---|---|---|---|---|
| Pickup of initial weight gain before conversion, percent | 44 | 16 | 26 | 40 |
| Weight loss after conversion, percent | 26 | 12 | 18.42 | 23 |
| Breaking strength: | | | | |
| Warp | 114.7 | 125 | 110 | 120 |
| Fill | 80.8 | 79.3 | 70.25 | 79.5 |
| Elongation, percent: | | | | |
| Warp | 14.1 | 14.6 | 12.5 | 15.6 |
| Fill | 18.8 | 15.6 | 18.8 | 18 |
| Thickness | .006 | .00553 | .0059 | .006 |
| Mullen bursting strength in lbs./sq. in. | 160 | 120 | 113 | 162 |
| Abrasion resistance 1,000 cycles, CS-5 wheel (percent loss) | .162 | .153 | .284 | .063 |
| Vertical flame (inches char) | .3 | .25 | .45 | .15 |
| Sublimation rate mil/° C., over 1,130° F. ambient | .019 | .018 | .02 | .0156 |
| Elmendorf tear, grams | 1,917 | 1,950 | 1,200 | 1,953 |

Example 5

The high molecular weight polymer fabric F known under the trade name of Nomex (U.S. Pat. No. 3,287,324 by W. Sweeny dated Nov. 22, 1966, Example 16), is prepared by reacting an aromatic diacid chloride with an aromatic diamine. HT-1 (U.S. Pat. 3,287,324 by W. Sweeny dated Nov. 22, 1966, Example 14) may also be used as a base material instead of Nomex but with similar results. Small fabric swatches of twill construction, 6 oz./sq. yd., weight 80 x 72 count, spun Nomex are placed in an autoclave which is charged with 200 cc. polymerizable or reacting mixture containing the following:

(1) 25% of molybdenum disulfide ($MoS_2$)
(2) 5% of hexafluoroethylene ($C_2F_6$)
(3) 3% of magnesium oxide
(4) 25% dimethyl formamide
(5) 0.2% ammonium persulfate
(6) 0.91% (percent by weight) of amino-methyl-propanol
(7) 40.89% 2-propanol The autoclave is sealed, pressurized to 5 atmospheres and the reacting compound is allowed to penetrate the fabric F at room temperature for 10 minutes.

The container is then depressurized and the saturated fabric transferred to the section autoclave (station 3) which is heated to about 750° F. maintaining maximum of 5 atmospheres of pressure for one hour. Upon removal from the autoclave, the fabric has a visible bluish and trace of white residue which is removed by washing.

The samples are employed to illustrate that the fabric has changed weight and increased in heat and flame resistance as a result of the reaction. (Reference Table VI.)

Example 6

The same reacting compound and method was used but the fabric being again Nomex, varied in weight, weave and yarn construction, namely, sample;

(a) consisted of Nomex with plain weave, 2.4 oz./sq. yd., 47 x 45 count, filament yarn.
(b) Nomex plain weave, 3.6 oz./sq. yd., 69 x 64 count, filament yarn.
(c) Nomex consisting of Jersey knit, 24 x 45 count, 3.5 oz./sq. yd. weight, and filament yarn.
(d) Nomex "Leno" weave, 1.3 oz./sq. yd., 36 x 14 count, filament yarn.
(e) Nomex with twill weave, 4.1 oz./sq. yd. weight, 82 x 64 count and filament yarn.

Filament yarn of Nomex measured 200 den./100 filament and spun Nomex, natural staple. (Reference Table IV.)

Example 7

The same reactant was used as described in Example 5 to saturate Nomex of twill construction, 6 oz./sq. yd., weight and 80 x 72 count spun yarn construction. A sample of this fabric, size 18 x 18 inches square, was placed first in an autoclave and saturated with reacting compound as described in Example 5 then, upon conclusion of saturation, was dried and placed in the reacting chamber of which the volume was 35 cubic feet, 25,000 B.t.u./hr., recirculating flow 205.8 cu. ft./min., total recirculating gas flow capacity, 1,700 c.f.m., total exhaust 144 c.f.m. with recirculating velocity 205.8 cu. ft./min.

The reaction cycle utilized for this purpose is described on Table I.

After termination of the reaction the samples were rinsed, dried and tested for heat resistance and strength.

NOTE: During this reaction, the Nomex, 6 oz./sq. yd., was checked for weight pickup and reduction after the product was fully reacted and cleaned (washed). It was established that during this experiment the weight of the fabric was 9.13 oz./sq. yd., dry, when removed from saturation autoclave, 7.06 oz./sq. yd. after reaction was completed, and 5.83 oz./sq. yd. after washing and drying.

Example 8

The reaction compound and method was repeated as described in Example 7 with the exception of fabric pickup of dry reactant weight which was varied to establish the maximum—minimum range of reactance required to produce heat resistant—flame resistant fabric and also to determine the effect of heat or flame resistance with respect to reacting compound pickup.

For this purpose 4 oz./sq. yd. of Nomex sateen weave fabric was used and the pickup varied based on reactant and viscosity adjustment with methylene chloride used as a diluent. The result of viscosity, weight pickup and net weight of the finished product, is included in the table attached titled, "Reactant Compound Variable Pickup by Fabric," Table III.

TABLE III.—REACTANT COMPOUND VARIABLE PICKUP BY FABRIC

| Viscosity, c.p.s. | Dry weight, ounces/square yard | | | | | | |
|---|---|---|---|---|---|---|---|
| | Original | After saturation | Pickup | After reaction | Change | Wash | Final net change |
| 100 | 3.92 | 7.71 | 3.79 | 3.69 | −.230 | 2.58 | −1.34 |
| 88 | 4.03 | 7.65 | 3.62 | 3.73 | −.300 | 2.62 | −1.41 |
| 80 | 3.91 | 8.21 | 4.30 | 3.85 | −.06 | 2.60 | −1.31 |
| 72 | 3.97 | 7.64 | 3.67 | 3.65 | −.32 | 2.60 | −1.37 |
| 59 | 3.93 | 7.22 | 3.29 | 3.49 | −.44 | 2.52 | −1.41 |
| 48 | 3.93 | 5.85 | 1.92 | 3.10 | −.83 | 2.47 | −1.46 |
| 41 | 3.82 | 6.56 | 2.74 | 2.99 | −.83 | 2.16 | −1.66 |
| 30 | 3.83 | 6.13 | 2.30 | 3.04 | −.79 | 2.35 | −1.48 |
| 19 | 3.91 | 6.30 | 2.39 | 3.25 | −.66 | 2.51 | −1.40 |
| 10 | 3.97 | 4.99 | 1.02 | 2.98 | −.99 | 2.64 | −1.33 |
| 5 | 4.03 | 4.28 | .25 | 2.72 | −1.31 | 2.67 | −1.36 |

Example 9

The compound as described in Example 5 was changed by exchanging the catalyst part, namely, 5% of hexafluoroethylene with 5% alkanes of which general formula is $Cl(Cf_2—CFCl)_xCl$ or chlorotrifluoroethylene, commercial grade, high molecular weight wax. This compound was then utilized on Nomex fabric as described in Example 7.

Example 10

The fabric saturated with compound is the same as described in Example 5 but 5% of catalyst excluded from the body of the compound. The sample saturated in autoclave as described in Example 5 was then processed and reacted as described in Example 7 but during the reaction in the reaction chamber, the catalyst was introduced at 400° F. as shown in the time cycle, Table I, where .3 cc./min. of boron trifluoride ($BF_3$) as a source of fluorine gas was entering the reaction chamber while the chamber contained $N_2$ atmosphere. This experiment was repeated several times where in each case, the catalyst portion was changed to boron trichloride ($BCl_3$) and bromine generated from aluminum tribromide.

Example 11

Another sample was prepared using 6 oz./sq. yd. of Nomex twill from spun yarn which was first saturated with reactive compound containing:

|  | Percent |
|---|---|
| (1) Molybdenum trichloride dibenzoate | 10 |
| (2) Triethyl acetate | 30 |
| (3) Tetrahydrofuran | 50 |
| (4) 12-dimethoxyethane | 5 |
| (5) Vanadium oxytrichloride ($V_2O_2Cl_3$) | 1.5 |
| (6) Magnesium titanite | .5 |
| (7) Zinc oxide | 3 |

The sample fabric was saturated as described in Example 5 and reacted as described in Example 7. The initial weight pickup of reactive compound described on the previous page was 8.21 oz./sq. yd. After the reaction, the sample weight was 7.21 and after wash and drying the weight was 5.72 oz./sq. yd.

Example 12

Again using 5.5 oz./sq. yd. Nomex twill the swatches of this fabric were saturated and reacted as described in (A) with 5% of molybdenum pentachloride ($MoCl_5$), 80% anhydrous alcohol, .3% dried palladium, 1% dry magnesium titanite and 13.7% trichlorobenzene.

The reaction proceeded in autoclave as described in Example 5 but the maximum pressure used was 2 atmospheres and 700° F. for 15 minutes.

The process of the described invention is useful in the treatment and subsequent reaction and thermal changes of the various fabrics experimented with and described.

This was evident by the tests performed on two pieces of fabric 4½ inches by 3 inches cut from treated fabric, that is saturated with reactive compound and properly allowed to react the compound with said fabric and washed as described in Examples 5 through 12. The cut pieces were placed simultaneously on heated metal block and covered with a glass plate. None of the fabrics processed as described in the invention have melted, shriveled or stuck to the glass or metal plate when the temperature of the block was increased to 800° F. Unprocessed fabrics melted, shriveled and became sticky or brittle at a temperature of 650° F.

Samples of fabrics processed as described in this invention were also tested against direct flame flux extended to 2 col./cm. seconds. The visual result indicated that all processed samples regardless of configuration, that is filament or staple, remained unaffected by flame while the unprocessed fabric charred, inflamed or shriveled in less than 1.34 col./cm. seconds flame flux. Total measured exposure time used for this test was 3 seconds, however, the treated Nomex fabric as described by the invention maintained unaffected as long as 60 seconds.

Depending upon the type of starting material, the reactive compound (monomer) used for the process, the polymerization or reaction, the temperature and time period for the process, the polymerization or reaction catalyst used and other things, compound, modified fabric or materials resulting from use of method of this invention, display many chemical and physical characteristics which are different from those of the corresponding untreated materials.

In most cases the treated material displays markedly reduced moisture gain, acid and solvent resistance as shown in Tables XI and XII titled "High Temperature Flame-Resistant Textile (HTFT) Immersion Test Results."

Example 13

Nomex of plain weave 3.6 oz./sq. yd. was saturated with solution of colloidal suspension containing submicron tungsten disulfide particles and fast drying isopropanol carrier. The base formulation of suspension contains 20% of tungsten disulfide particles ranging in size from 0.50 to 0.133 microns (Fisher), 0.91% of dioctyl sodium sulfosuccinate, 1.55% acetic acid, 2.3% 2-amino-2-methyl-1-propanol, 12.4% 2,6 ditert-butyl 4-methyl phenol and 7.4 isopropyl alcohol.

The above product was adjusted to 80 c.p.s. at 70° F. and the base fabric saturated. The dry weight pickup of the compound saturated was 32% of the fabric weighed. The catalyst used was introduced in the reacting chamber in the form of gas which was chlorine (Cl) generated from aluminum trichloride. The product was allowed to react in the reaction chamber for the normal cycle described in Table I. After the completion of the reaction cycle, the material was passed through the washing bath where the added surfactant and soaps were introduced to remove the residue, following the rinse which contained .5% of acetic acid.

Upon sufficiently cleaning the fibers, the product was dried and ready for use.

Example 14

3.4 oz. PBI fabric which is made of virgin polymer better known as polybenzimidazole, basic organic chemical concept of poly[2,2-(m-phenylene)-5,5' bibenzimidazole] or general assay of the product is $C_{20}H_{12}N_4$, formed by the reaction of diphenyl isophthalate and 3,3' diaminobenzidine:

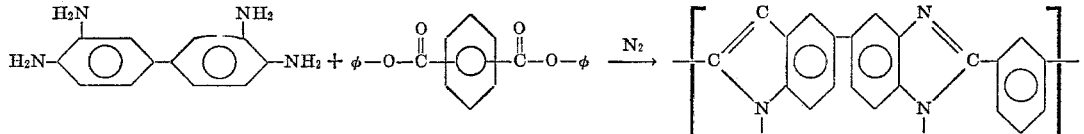

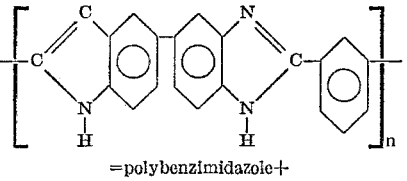

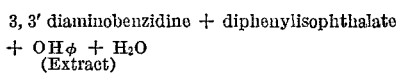

FIG. 16 was saturated as first experiment with the formulation described in Example 5 and the second identical sample was saturated with formulation described in Example 13. The fully saturated samples were dried and processed in the reaction chamber using the same cycle as described in Table I following the standard procedure of washing and drying.

Reference on PBI:
Phillips, R. W., (Polybenzimidoclies) "Polymer of Polymeric Sciences B2, 47" (1964).
Wrazidol, W.J., and Levine, H. H., "Polybenzimidazoles Reaction Mechanisms and Kinetics" and "Polymer of Polymeric Sciences A2, 4795–4808" (1964).

Example 15

Rayon fabric of plain weave construction and weight 5.8492 oz./sq. yd., identified as stock number PFR-4 manufactured by FMC Corporation, American Viscose Division, was reacted with described invention.

This fabric was of common variety type rayon which is known to be the re-generated cellulose type namely:

that the product has been treated with ammonium hydrosulfide solution prior the subjection to the process with an effort to reduce the flammability during the initial drying process.

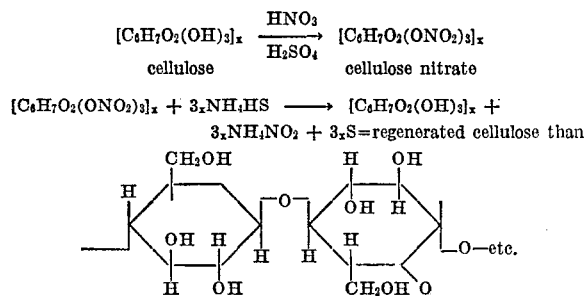

FIG. 17

General construction of the rayon fabric is indicated above.

This product was then subjected to treatment with the invention compound as described in A and subsequently allowed to react in the chamber using the same cycle as described in Table I. Following the procedure the product was then washed, dried and tested. The results are included in Tables V and VII.

Example 16

Cotton fabric, 8 oz./sq. yd. which was amanized by reacting with 2-amino ethyl sulfuric acid with a cellulose, was thoroughly washed and dried in clean solvent predominantly tetrahydrofuran, to remove any pretreatment or excess oils and was then treated with formulation described in Example 9 by means of saturation following the reaction in the reaction chamber. The reaction was accomplished successfully at 520° F. for 10 minutes. The finished product upon washing and drying demonstrated 50% reduction of moisture pickup and exhibited excellent flame resistance. The final product was heat resistant at least 10 minutes at 800° F. in comparison to the nontreated fabric completely disintegrating at 480° F. in the same period of time.

The second sample of the same cotton fabric was placed in sodium chloride solution for 5 minutes then directly saturated with the invention formula containing molybdenum disulfide formula described in Example 5 and again allowed to react for 10 minutes at 500° F. The resultant product exhibits slight stiffness but showed for a short period of time, heat resistance up to 800° F. and no glowing effect which is common with untreated cellulose fiber. Results are shown in Table V titled "High Temperature Flame-Resistant Textile (HTFT) Physical Properties" and Table VII titled "High Temperature Flame-Resistant Textile (HTFT) Thermal Properties."

Further definition of polyamide polymer of Nomex or similar related polymer as discussed in previous pages of the invention the definition of the polyamide polymer is substantially brought in scope, if considered, by various raw materials, however, the basic principle involved for nylon, Nomex and other polyamide polymers is as follows:

TABLE IV.—HIGH TEMPERATURE FLAME-RESISTANT TEXTILE PHYSICAL PROPERTIES

| Style number | Weave | Weight/ sq. yard, oz. | Count | Yarn | Tensile (W x F) | Tear, lbs.-inches |
|---|---|---|---|---|---|---|
| 5006/8010 | Twill | 6.0 | 80 x 72 | Spun [1] | 105 x 96 | 8.4 x 7.0 |
| 5114/8010 | Plain | 2.4 | 47 x 45 | Filament [1] | 80.5 x 60 | 13.34 x 11.9 |
| 5139/8010 | do | 3.6 | 69 x 64 | do [2] | 89.6 x 47 | 9.1 x 10 |
| 5807/8010 | Jersey knit | 3.5 | 24 x 45 | do [2] | 44 x 65 | |
| Batting/8010 | Leno | 1.3 | 36 x 14 | do [2] | 6.6 | 12 x 11.5 |
| 5614/8010 | Twill | 4.1 | 82 x 64 | do [2] | 192 x 155 | 12 x 11.5 |
| 5995/8010 | Oxford | 5.59 | 62 x 46 | do [2] | 189 x 175 | 19.34 x 16.4 |
| 5995/7001 | do | 5.4 | 62 x 46 | do [2] | 300 x 273 | 21.8 x 17.5 |

[1] Spun—Natural staple.
[2] Filament—200 den./100 filament.

TABLE V.—HIGH TEMPERATURE FLAME RESISTANT TEXTILE (HTFT) PHYSICAL PROPERTIES

| Virgin fiber converted to HTFT | (1), breaking strength, lb./in. | | (2), tongue tear, lbs. | | (3), Mullen burst, p.s.i. | (4), weight, oz./sq.yd. | (5), percent weight loss after reaction | Reactor example |
|---|---|---|---|---|---|---|---|---|
| | W | F | W | F | | | | |
| Nylon Nomex HT ACS-2246 | 76.6 x | 44 | 12 x | 8 | 180 | 3.4 | 5.6 | 13 |
| PBI, 3.4 | 72 x | 53 | 11 x | 9 | 172 | 3.2 | 6.0 | 14 |
| Rayon Avisco PFR-2, 7.8 | 48 x | 38 | 6 x | 3 | 95 | 5.2 | 33.0 | 15 |
| Rayon Avisco PFR-4, 5.8 | 52 x | 41 | 7 x | 5 | 111 | 4.5 | 22.0 | 15 |
| Cotton, 8 | 32 x | 27 | 4 x | 3 | 75 | 5.0 | 37.0 | 16 |
| Do | 41 x | 36 | 5.5 x | 4 | 83 | 5.9 | 26.0 | 16 |

Note.—Test conducted: May 7, 1968. Test conducted as per mil spec. CCC-T 191b methods:
[1] 5100.
[2] 5134.
[3] 5122.
[4] 5041.
[5] 5041.

TABLE VI.—HIGH TEMPERATURE FLAME-RESISTANT TEXTILE (HTFT) VS. NOMEX TEMPERATURE RISE IN SIMULATED SKIN

| Type | Fabric | | Flame contact | | Radiation | |
|---|---|---|---|---|---|---|
| | Weight, oz./yd.² | Color | Flux cal, cm.³ sec. | Δ T¹, °C., unit flux | Flux cal., cm.² sec. | Δ T¹, °C., unit flux |
| HTFT staple | 3.8 | Brown | 1.32 | 23.3 | 9.7 | 5.1 |
| Nomex filament | 5.0 (3.8) | White | 1.34 | {20.1 (26.4)} | 9.7 | 3.8 |
| Nomex staple | 3.3 | ...do | 1.28 | 23.4 | 10.6 | 4.7 |
| HTFT filament | 5.5 | Black | 1.26 | 19.2 | 11.3 | 4.2 |

¹ Measured at 3 sec. exposure time.

TABLE VII.—HIGH TEMPERATURE FLAME-RESISTANT TEXTILE (HTFT) THERMAL PROPERTIES

| Virgin fiber converted to HTFT | (¹), inches | (²), temp., °C. | (³), percent | (⁴) Flux cal., cm.² sec. | Δ T, °C., unit flux | (⁵) Flux cal., cm.² sec. | Δ T, °C., unit flux | Sample |
|---|---|---|---|---|---|---|---|---|
| Nylon HT, ACS-2246 | .006 | 1,100 | 92 | 1.18 | 22.2 | 8.7 | 6.3 | 13 |
| PBI, 3.4 | .009 | 1,085 | 87 | 1.2 | 23.0 | 9.9 | 5.9 | 14 |
| Rayon, Avisco PFR-2, 7.8 | .75 | 360 | 57 | 1.4 | 25.0 | 10.0 | 8.2 | 15 |
| Rayon, Avisco PFR-4, 5.8 | .63 | 385 | 59 | 1.38 | 24.7 | 9.8 | 7.7 | 15 |
| Cotton, 8 | 2.6 | 305 | 47 | 1.32 | 26.2 | 9.9 | 7.9 | 16 |
| Do | 2.6 | 309 | 49 | 1.3 | 26.0 | 10.3 | 7.6 | 16 |

¹ Flammability vertical test (NFPA-701) length direction; char length.
² Pyrolysis temperature (DTA) Fisher Model 260.
³ Char yield after pyrolysis.
⁴ Flame contact measured 3 seconds total exposure.
⁵ Radiation exposure measured time; 2 seconds exposure time.

NOTE.—Tested: June 11, 1968.

TABLE VIII.—THERMAL CONDUCTIVITY OF HIGH TEMPERATURE FLAME-RESISTANT TEXTILE (HTFT) VS. NOMEX

| Material | K, B.t.u. in./hr./ft.²/°F. | K/L, B.t.u./hr./ft.²/°F. | Thickness, inches | Specific heat |
|---|---|---|---|---|
| HTFT (5 layers) | .4104 | .0803 | .0355 | .386 |
| Nomex⁴ | .403 | 7.07 | .057 | .263 |

NOTE.—Trade names; Nomex⁴, Du Pont; ASTM test method #C177-45.

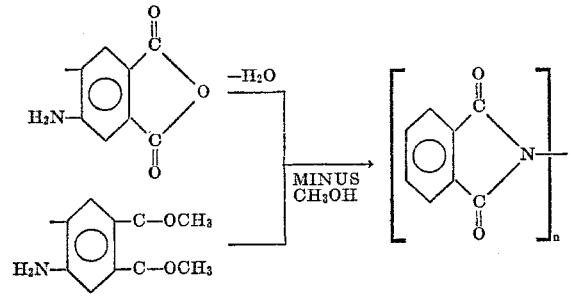

FIG. 18

4-aminophthalic anhydride and dimethyl-4-aminophthalate upon heating, eliminated water and methanol respectively creating a polyamide. This is the simple version of polyamide structure. More to date reaction of aromatic dianhydride with aromatic diamine in appropriate solvent forms intermediate polymeric acid. The soluble polymeric acid polymer is then dihydrated by thermal or chemical means to create polyamide which looks like this:

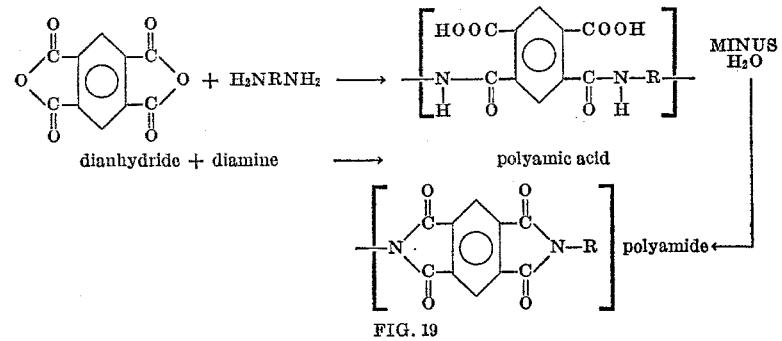

FIG. 19

Wide range of organic dianhydride and diamine compounds have been combined to form an exclusive formula of polyamide polymers.

The above is improved when increasing aromatically the structure and extension of chain or by elimination of average groups, that is hydrogen groups which this invention has accomplished or by variation of such chain extension susceptible to improve the basic polyamide which may be imide, ether, sulfide direct phenyl, phenyl bond, amide ester, and methylene isopropylidene. Polyamide also known other than Nomex which is constructed as product of benzophenone where tetracarboxylic dianhydride and 4,4'-oxydianiline yielding structure,

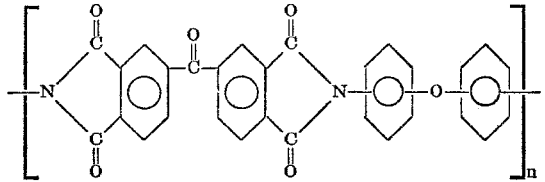

FIG. 20 or benzophenone tetracarboxylic dianhydride and metaphenylene diamine which produces the following structure:

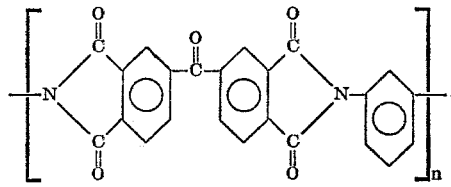

FIG. 21

References:
Further definition for the polyamide is listed in the Condensed Chemical Dictionary, 6th Edition, pages 819 and 820, Reinhold Publishing Corporation, New York, by Arthur and Elizabeth Rose, State College, Pennsylvania, 5th printing 1965.
Other references concerning nylon type materials are noted in the following patents: Nos. 2,130,948; 2,244,-

192; 3,006,899; 3,094,511; 3,287,324; 3,377,568; 3,354,-125 and 3,354,127.

CATALYSTS

Catalysts herein specified were all used in an effort to establish maximum efficiency and economy with the emphasis to eliminate certain special handling requirements.

In the process of the program fluorine or halogen compounds which are stable up to 500° F. at room temperature, were more frequently used. Other catalysts, however, particularly as gaseous halogen were also utilized in the invention. Those catalysts were introduced directly in station 3.

The preferred catalyst used was chlorotrifluoroethylene in the form of hard wax known as halo-fluorocarbon of which the general formula is Cl—$(CF_2$—$CFCl)_x$—Cl. This type of catalyst is introduced directly with the formula containing molybdenum disulfide, zirconium disulfide, etc., and applied to the given fabric by saturation in station 1. Gaseous catalysts on the other hand, such as chlorine, fluorine and bromine have been introduced in station 3 while the reaction chamber was in the process of heating. The introduction of such gaseous catalyst occurred while the chamber was heated at 400, 500 and as high as 600° F. Introduction of these catalysts in Station 3 required that the reaction chamber contain mostly inert gas such as nitrogen, argon or the mixture of both. However nitrogen ($N_2$) is preferred.

The above mentioned halogen gases were introduced from either compressed commercially available gas cylinders or from unstable halogenated compounds such as boron trifluoride, aluminum tribromide, aluminum trichloride, etc.

ANTIOXIDANTS

A series of antioxidants have been utilized during the formulation of the processing invention compound to hinder initial oxidation due to heating of the pretreated fabric. Although the antioxidants are not absolutely necessary in this invention, it has been established that they are contributing factors especially when treating or processing materials of lower temperature resistance such as rayon or cotton.

The antioxidants used predominantly were hindered phenolic compounds such as (4-dodecyloxy-2-hydroxybenzophenone) otherwise known by the tradename, DOBP manufactured by Eastman,
[2,2' - dithiobis(4 - t - octylphenolato) - n - butylamine nickel].
(2,6-di-tertbutyl 4-methylphenol) known by the trade name Ionol manufactured by Shell Chemical Company.
[2,2-methylene-bis-(4-methyl-6-tertbutylphenol) sebacic dihydrazide], formula ($C_{10}H_{22}O_2H_4$) manufactured by Olin Chemicals.
(2,6-di-teritary-butyl-para-cresol) 2,6 - di-tertiarylbutyl-4-methylphenol butylated hydroxy toluene (BHT) manufactured by the Catalin Corporation of America.

The preferred antioxidant is (4-dodecyloxy-2-hydroxybenzophenone). Other preferences were tetrachloro, tetrabromo, dinitra and di-phenolic acid, 4,4 - bis(4-hydroxyphenyl) pentanoic acid.

SURFACTANTS

Although the surfactants are not absolutely required in this invention, they aid in emulsification of compounds, illustrated as per samples, control viscosity and provide wetting effect of the fibers being treated and subsequently reacted. The most common surfactant used can be classified non-ionic and anionic, although, in some cases, cationic was also utilized. In addition to those that are mentioned in the formulations submitted, the anionic surfactant most widely used and preferred is 60% active dioctyl sodium sulfosuccinate known under the trade name Triton GR–5. The preferred wetting agent is 30% active sodium alkylaryl polyether sulfate. The preferred emulsifying agent is 2-amino-2-methyl-1-propanol.

ACID ACCEPTORS

Acid acceptors are frequently used in formulation of the invention not as an absolute necessity but as an added precaution to neutralize acid buildup due to moisture content in fibers prior to the reaction being assumed in station 3. To this end, most frequently, 1 to 3 parts of zinc oxide anhydrous or magnesium oxide are used in the form of suspension in alcohol which is simultaneously added throughout the fiber in station 1.

Oxygen scavengers and also acid neutralizers have been used in 35% hydrazine known trade name, Scav-Ox manufactured by Olin Chemicals. The preferred, however, is the magnesium oxide in the range of 1 to 2% based on solids of the available molybdenum disulfide in the system.

PROCESS DIAGRAM

The process diagram illustrates that the total process goes through 6 stations. In most cases, the given fabric in station 1 is being saturated with compounds which include, first of all, molybdenum disulfide or zirconium disulfide. The compounds of that station are introduced in emulsified or suspension form where certain amounts of pure molybdenum disulfide are picked up as specified on table entitled "Reaction Compound Variable Pickup by Fabric," Table III. By means of padding and saturation, the fabric may also pickup at this time, the necessary catalyst or the catalyst can be introduced in station 3. Upon properly coating the fabric with the invention compound molybdenum disulfide, the fabric or fiber is being passed through station 2. Station 2 evaporates the excess solvent or the low temperature sublimation components. The fabric then passed on to station 3 where the reaction is taking place whereby the undesirable elements are sublimated and molybdenum disulfide becomes a part or component of the fiber emerging out from station 3. Passing station 3 the fabric is now being passed through station 4 where certain soap and detergents of commercial variety as well as nonionic surfactant type lauryl alcohol known under the trade name Tergitol type 15–S–12 manufactured by Union Carbide Company or alkylaryl polyether alcohol known as Triton N100 manufactured by Rohm & Haas Company, are being used to remove the residue or unwanted deposit from said fiber or cloth. In any case, either one of these surfactants are necessary in order to facilitate expedient removal of the deposit. Either one of the surfactants is compounded with 5% of soda ash or 3% of sodium hydroxide in the ratio of 30% lauryl alcohol to 10% emulsified xylol plus indicated alkali namely sodium hydroxide etc. and water.

The processed material fiber or fabric coming out from station 3 is washed in station 4 and then rinsed in station 5. During the rinsing in station 5, clean water is used containing .5% of acetic acid which neutralizes any residue of alkali that may not be sufficiently rinsed in the first portion of the rinsing procedure.

The solvent used for cleaning and also in reaction, that is, as vehicle for the molybdenum disulfide solutions, is preferred to be alcohol, dimethyl formamide (DMF), tetrahydrofuran (THF), hexafluoroethylene, methylene chloride and trichloroethylene. In most cases, however, trichlorotrifluoroethane $CCl_2F$–$CClF_2$ known as Freon TF solvent manufactured by DuPont, is also used to remove any increase or excessive oil prior the application of invention compounds. The most essential solvents are alcohol and tetrahydrofuran.

TABLE IX
HIGH TEMPERATURE FLAME-RESISTANT TEXTILE (HTFT)
THERMAL GRAVIMETRIC ANALYSIS
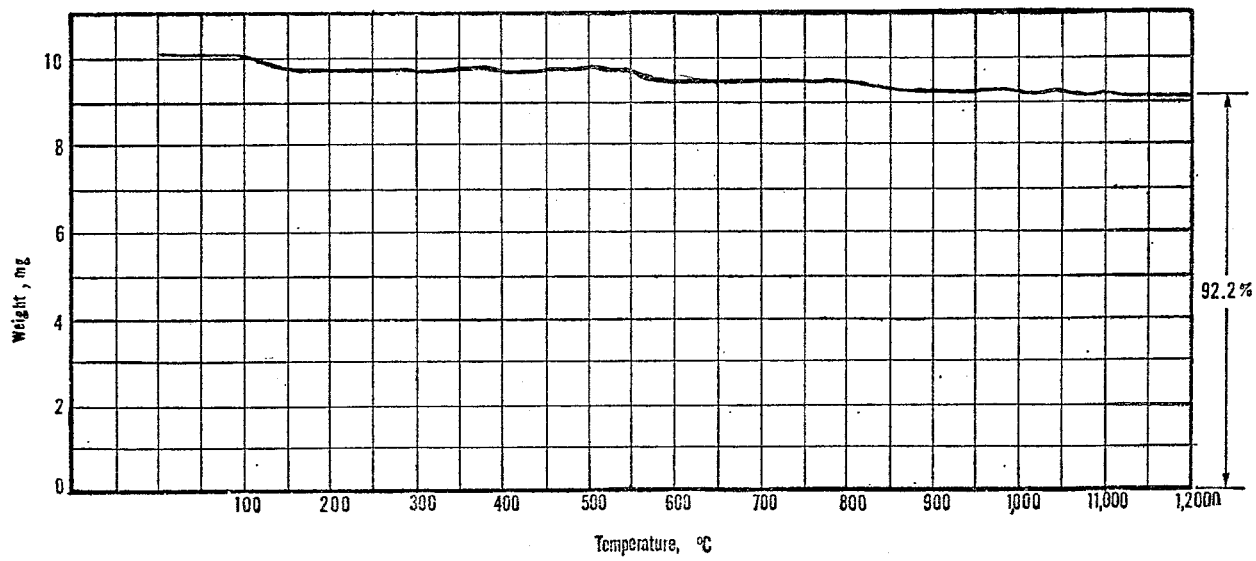
Sample Size — 10 mg
Gas Flow Rate — 1 cfh Air
Temp. Rise — 25°C/min
TABLE X
HIGH TEMPERATURE FLAME-RESISTANT TEXTILE (HTFT)
DIFFERENTIAL THERMAL ANALYSIS
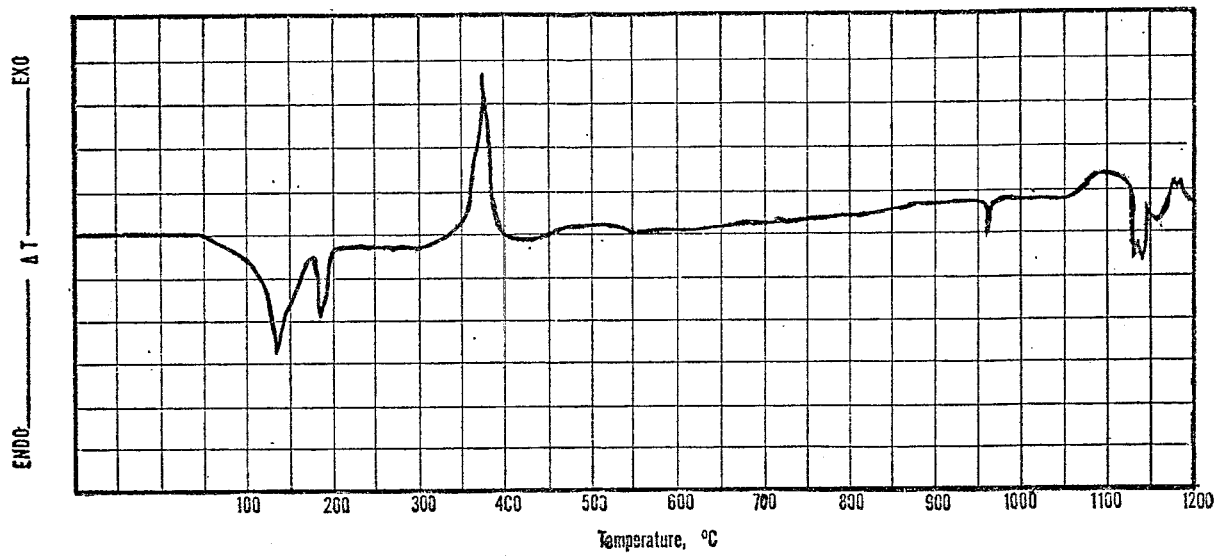
Sample Size — 10 mg
Reference — Glass Beads
Gas Flow Rate — 1 cfh Air
Temp. Rise — 25°C/min

TABLE XI.—HIGH TEMPERATURE FLAME-RESISTANT TEXTILE (HTFT)—IMMERSION TEST RESULTS

| Reagents | Concentration, percent | Temperature, °C. | Shrinkage of warp, percent | Retention of strength, warpwise, percent | Appearance and effect |
|---|---|---|---|---|---|
| Inorganic acids: | | | | | |
| Aqua regia | 25 | 150 | 1.04 | 42.2 | Reddish stain. |
| Chromic acid | 25 | 120 | 0 | 84.5 | No effect. |
| Hydrochloric acid | 48 | 160 | 5.21 | 25.4 | Color darkened. |
| Hydrofluoric acid | 48 | RT | 0 | 71.8 | No effect. |
| Nitric acid | 20 | 160 | 3.12 | 15.5 | Very reddish stain. |
| Phosphoric acid | 37 | 160 | 0 | 105.5 | No effect. |
| Organic acids: | | | | | |
| Acetic acid | 25 | 160 | 0 | 111.3 | Do. |
| Do | 75 | 160 | 0 | 91.6 | Do. |
| Formic acid | 100 | 120 | 0 | 84.5 | Slight red stain. |
| Phenol | 5 | 120 | 0 | 76.1 | No effect. |
| Base: | | | | | |
| Ammonium hydroxide | 28 | RT | 0 | 84.5 | Do. |
| Potassium hydroxide | 25 | 160 | 0 | 77.5 | Do. |
| Do | 50 | 120 | 0 | 54.9 | Do. |
| Sodium hydroxide | 25 | 160 | 3.12 | 50.7 | Color darkened. |
| Do | 50 | 120 | +1.40 | 73.2 | No effect. |

TABLE XII.—HIGH TEMPERATURE FLAME-RESISTANT TEXTILE (HTFT)—IMMERSION TEST RESULTS

| Reagents | Concentration, percent | Temperature, °C. | Shrinkage of warp, percent | Retention of strength, warpwise, percent | Appearance and effect |
|---|---|---|---|---|---|
| Inorganic salts in water: | | | | | |
| Ferric nitrate | 50 | 160 | 0 | 56.3 | Reddish stain. |
| Sodium acetate | 50 | 160 | 0 | 115.5 | No effect. |
| Sodium dichromate | 50 | 160 | 0 | 78.9 | Slight reddish stain. |
| Zinc chloride | 50 | 160 | 0 | 91.5 | No effect. |
| Oxidizing agents: | | | | | |
| Sodium hypochlorite | 5-6 | 120 | 0 | 100.0 | Do. |
| Miscellaneous organic chemicals: | | | | | |
| Acetone | 10 | 120 | 0 | 98.6 | Do. |
| Chloroform | 100 | RT | 0 | 70.4 | Do. |
| Triethanolamine | 25 | 120 | 0 | 77.5 | Do. |
| Butyl "Cellosolve" acetate | 100 | 120 | 0 | 100.0 | Do. |
| Ethyl acetate | 100 | 120 | 0 | 70.4 | Do. |
| Ethyl alcohol | 100 | 120 | 0 | 84.5 | Do. |
| Formaldehyde | 40 | 120 | 0 | 93.0 | Do. |
| UP-4 | 100 | RT | 0 | 77.5 | Do. |
| Trichloroethylene | 90 | 160 | +1.04 | 100.0 | Slight stain. |

The invention has been described in detail for the purpose of illustration but it will be obvious to those skilled in the art that numerous modifications and variations may be resorted to without departing from the spirit of the invention as set forth in the accompanying claims.

What is claimed is:

1. The process of increasing the heat resistance and flame proof characteristics of (1) a base material including carbon and hydrogen atoms which process comprises treating said base material with (2) a reacting component containing a metal atom to replace part at least of the carbon and hydrogen atoms of said base material with metal atoms, said base material being fibers or fabrics selected from a group consisting of polyamides containing aromatic groups, regenerated cellulose and natural cellulose fibers, and said reacting component being selected from a group consisting of components containing molybdenum and components containing tungsten atoms, said treating operation being carried out at a temperature from about 600° F. to about 1200° F. at a pressure from about one-half to 2 atmospheres and for a period from about one-half minute to about 30 minutes in the presence of a catalyst.

2. The process as set forth in claim 1 wherein the base material is nylon.

3. The process as set forth in claim 1 wherein the base material is a long chain polymeric amide having recurring amide groups as part of the main polymer chain.

4. The process as set forth in claim 1 wherein the base material is a polyamide derived from phenylenediamine and iso- or terephthalic acid.

5. The process as set forth in claim 1 wherein the base material is a natural cellulosic fiber.

6. The process as set forth in claim 1 wherein the base material is rayon.

7. The process as set forth in claim 1 wherein the reacting component contains molybdenum atoms.

8. The process as set forth in claim 1 wherein the reacting component comprises molybdenum disulphide.

9. The process as set forth in claim 1 wherein the reacting component contains a tungsten atom.

10. The process as set forth in claim 1 wherein the reacting component is tungsten disulphide.

11. The process as set forth in claim 1 wherein the catalyst comprises a halogen component.

12. The process as set forth in claim 11 wherein the halogen component is in gaseous form.

13. The process as set forth in claim 1 wherein the catalyst is contained in a bath wherein the base material is initially treated.

14. The process as set forth in claim 1 wherein the catalyst is a polymeric halogen derivative of ethylene.

15. The process as set forth in claim 1 wherein the catalyst is a metal halide.

16. The process as set forth in claim 1 wherein the catalyst is an aluminum halide.

17. The process as set forth in claim 1 wherein the catalyst is a metal oxide.

18. The process as set forth in claim 1 wherein the catalyst is palladium.

19. The process as set forth in claim 1 wherein the catalyst is $VOCl_3$.

20. A process as set forth in claim 1 wherein the base material is initially saturated with the reacting component in solution and thereafter heat reacted in a closed reactor chamber at a temperature of from about 600° F. to about 1200° F.

21. A process as set forth in claim 20 wherein the heat reaction is carried out at a temperature of about 800° F.

22. A process as set forth in claim 20 wherein the pressure within the reactor is maintained at from about one-half to 2 atmospheres.

23. A process as set forth in claim 22 wherein the heating within the reaction chamber extends for a period of from about ½ minute to about 30 minutes.

24. A product comprising a base material treated in accordance with claim 1 and having improved heat resistant and flame proof characteristics.

25. A process for increasing the heat resistant characteristics of (1) a synthetic nylon type polyamide polymer fiber or fabric which process comprises treating said fiber or fabric by reacting with (2) a substance containing a molybdenum atom, said polyamide polymer containing aromatic groups and said treating being carried out at a temperature from about 600° F. to about 1200° F., at a pressure from about one-half to 2 atmospheres and for a period from about one-half minute to about 30 minutes in the presence of a catalyst.

26. A process as set forth in claim 25 wherein component (2) is molybdenum disulfide.

27. The process as set forth in claim 25 wherein the catalyst comprises a gaseous halogen.

28. A process as set forth in claim 25 wherein the catalyst is a polymeric halogen compound.

29. A process as set forth in claim 25 wherein the catalyst is selected from a group consisting of halogen containing polymers, palladium, magnesium titanate, vanadium oxytrichloride, magnesium oxide and zinc oxide.

30. A process as set forth in claim 25 wherein component (2) is selected from a group consisting of molybdenum disulfide, molybdenum pentachloride, molybdenum sesquioxide, molybdic acid and molybdenum isotopes.

31. A process as set forth in claim 25 wherein component (1) is treated with molybdenum disulfide containing finely divided molybdenum particles of a size approximating .5 micron and then dried in an inert atmosphere containing a catalytic amount of a gaseous halogen and heated to a temperature of about 800° F. whereby some at least of the organic radicals of component (1) are replaced by molybdenum.

32. A heat resistant polymer of low flammability characteristics produced in accordance with the process of claim 25.

33. The process of increasing the high heat resistant characteristics of an organic long chain polyamide in fiber form containing carbon and hydrogen atoms, which comprises treating said fiber with molybdenum disulfide in solution and heat reacting said treated fiber with the aid of a catalyst, thereby replacing at least some of the carbon and hydrogen atoms with molybdenum atoms, said polyamide containing aromatic groups and said treating being carried out at a temperature from about 600° F. to about 1200° F., at a pressure from about one-half to 2 atmospheres and for a period of from about one-half minute to about 30 minutes.

34. A heat and flame resistant product produced by reacting (1) a synthetic nylon type polymer containing organic radicals derived from phenylenediamine, isophthalic and terephthalic acid, diacid chloride and diamines containing only two aromatic nuclei linked by preformed carbonamide linkages or; wholly aromatic polyamides using diaminobenzanilides and diacid chlorides with (2) a substance containing molybdenum atoms in the presence of a catalyst.

35. The product as set forth in claim 34 wherein component (2) is $MoS_2$.

36. The product as set forth in claim 34 wherein the catalyst is comprised of halogen gases.

37. The product as set forth in claim 34 wherein the catalyst is a polymeric halogen compound.

38. The product as set forth in claim 34 wherein the catalyst is selected from a group consisting of halogen containing polymers, palladium, magnesium titanate, aluminum trichloride, aluminum tribromide, magnesium zinc oxide and magnesium oxide.

39. The product as set forth in claim 34 wherein component (2) is selected from a group consisting of molybdenum disulfide, molybdenum pentachloride, molybdenum sesquioxide, molybdeic acid and molybdenum isotopes.

40. The product as set forth in claim 34 wherein component (1) is treated with $MoS_2$ containing molybdenum particles of a size approximately less than .5 micron and then treated in an inert atmosphere containing a small amount of gaseous catalyst, and heating to a temperature of 800° F. whereby some of the organic radicals of component (1) are replaced by molybdenum.

References Cited
UNITED STATES PATENTS

| | | | |
|---|---|---|---|
| 2,151,166 | 3/1939 | Slatincan | 260—212 X |
| 3,607,798 | 9/1971 | Hirsch | 260—78 SC |
| 2,749,256 | 6/1956 | Bottoms | 8—116 R |
| 3,018,262 | 1/1962 | Schroeder | 8—116 R |
| 3,239,485 | 3/1966 | Koch | 260—78 SC |
| 2,849,415 | 8/1958 | Stott | 260—37 N |
| 3,549,307 | 12/1970 | Hirsch | 260—78 SC |

GEORGE F. LESMES, Primary Examiner

R. E. MARTIN, JR., Assistant Examiner

U.S. Cl. X.R.

8—116 R; 260—78 SC, 212 R, 218; 161—403, 411